United States Patent
Jeong et al.

(10) Patent No.: US 11,425,291 B2
(45) Date of Patent: Aug. 23, 2022

(54) CAMERA MODULE

(71) Applicant: SAMSUNG ELECTRO-MECHANICS CO., LTD., Suwon-si (KR)

(72) Inventors: Seung Hyeon Jeong, Suwon-si (KR); Sung Hoon Kim, Suwon-si (KR); Sung Taek Oh, Suwon-si (KR); Dong Shin Yang, Suwon-si (KR); Ho Sik Yoo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/161,980

(22) Filed: Jan. 29, 2021

(65) Prior Publication Data

US 2021/0281722 A1 Sep. 9, 2021

(30) Foreign Application Priority Data

Mar. 4, 2020 (KR) .................. 10-2020-0027388
Sep. 2, 2020 (KR) .................. 10-2020-0111832

(51) Int. Cl.
*H04N 5/225* (2006.01)
*H04M 1/02* (2006.01)

(52) U.S. Cl.
CPC ........ *H04N 5/2254* (2013.01); *H04M 1/0264* (2013.01); *H04N 5/2253* (2013.01); *H04N 5/2257* (2013.01); *H04M 2250/52* (2013.01)

(58) Field of Classification Search
CPC .. H04N 5/2251; H04N 5/2252; H04N 5/2254; H04N 5/2257; H04M 1/0264; G02B 27/0018

(Continued)

(56) References Cited

U.S. PATENT DOCUMENTS 9,904,050 B2 * 2/2018 Lin .................. G02B 7/025
2016/0011415 A1 1/2016 Takada
(Continued)

FOREIGN PATENT DOCUMENTS

CN 106291857 A 1/2017
JP 2654781 B2 5/1997
(Continued)

OTHER PUBLICATIONS

Korean Office Action dated Nov. 17, 2021 in corresponding Korean Patent Application No. 10-2020-0111832. (5 pages in English and 4 pages in Korean).

(Continued)

*Primary Examiner* — Anthony J Daniels
(74) *Attorney, Agent, or Firm* — NSIP Law

(57) ABSTRACT

A camera module includes: a lens module including a plurality of lenses; a housing accommodating the lens module; a reflection module disposed in front of the lens module; an image sensor module configured to receive light passing through the lens module; and a light blocking portion disposed in the housing and positioned in a space between the lens module and the image sensor module. The light blocking portion includes: a first light blocking plate including a first window having a first opening through which the light is allowed to pass; and a second light blocking plate including a second window having a second opening through which the light is allowed to pass. The first window includes a first inner wall including a first inclined surface, and the second window includes a second inner wall including a second inclined surface.

22 Claims, 6 Drawing Sheets

(58) Field of Classification Search
USPC .......................................................... 348/241
See application file for complete search history.

(56) References Cited

U.S. PATENT DOCUMENTS

| | | |
|---|---|---|
| 2016/0072996 A1 | 3/2016 | Rammah et al. |
| 2016/0377827 A1 | 12/2016 | Kang et al. |
| 2018/0128943 A1* | 5/2018 | Hibino .................. H04N 5/2257 |
| 2019/0018171 A1 | 1/2019 | Chang et al. |
| 2020/0007723 A1* | 1/2020 | Zhang .................. H04N 5/2253 |
| 2020/0209441 A1* | 7/2020 | Chen .................... G02B 5/0221 |
| 2020/0333691 A1* | 10/2020 | Shabtay ................. G02B 7/021 |
| 2020/0341228 A1* | 10/2020 | Wu ........................ G02B 7/021 |

FOREIGN PATENT DOCUMENTS

| | | |
|---|---|---|
| JP | 5619561 B2 | 11/2014 |
| JP | 5807139 B2 | 9/2015 |
| JP | 5877953 B2 | 3/2016 |
| KR | 10-2020-0006607 A | 1/2020 |

OTHER PUBLICATIONS

Chinese Office Action dated Mar. 9, 2022 in corresponding Chinese Patent Application No. 202110233475.5 (8 pages in English and 9 pages in Chinese).

\* cited by examiner

CAMERA MODULE

CROSS-REFERENCE TO RELATED APPLICATIONS

This application claims the benefit under 35 U.S.C. § 119(a) of Korean Patent Application No. 10-2020-0027388 filed on Mar. 4, 2020 and Korean Patent Application No. 10-2020-0111832 filed on Sep. 2, 2020, in the Korean Intellectual Property Office, the entire disclosures of which are incorporated herein by reference for all purposes.

BACKGROUND

1. Field

The following description relates to a camera module.

2. Description of Related Art

In recent years, a camera module has been installed as standard equipment in a portable electronic device, such as a smartphone. The portable electronic device may have a reduced thickness based on market demand, and a camera module of the portable electronic device may therefore be required to be miniaturized.

Apart from demand for miniaturization, the camera module is also required to have improved performance, and may thus have added functions such as autofocusing and optical image stabilization. Accordingly, there is a limit to reducing the size of the camera module. That is, the camera module may be difficult to implement with a smaller size despite the demand for its miniaturization, and, accordingly, there is a limit to reducing the thickness of the portable electronic device.

In order to solve this problem, a camera module may have a plurality of lenses arranged in the length direction or width direction of the portable electronic device, rather than a thickness direction of the portable electronic device, and having a reflective member configured to change the path of light. Such a camera module has a structure different from a conventional camera module, such as having a longer total track length and having the reflective member, and may therefore have an image quality that is deteriorated due to a flare phenomenon that does not occur in a conventional camera module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a lens module including a plurality of lenses; a housing accommodating the lens module; a reflection module disposed in front of the lens module; an image sensor module configured to receive light passing through the lens module; and a light blocking portion disposed in the housing and positioned in a space between the lens module and the image sensor module. The light blocking portion includes: a first light blocking plate including a first window having a first opening through which the light is allowed to pass; and a second light blocking plate including a second window having a second opening through which the light is allowed to pass.

The first window includes a first inner wall including a first inclined surface, and the second window includes a second inner wall including a second inclined surface.

The first inner wall may be configured to increase a size of the first window in a direction toward the image sensor module. The second inner wall may be configured to increase a size of the second window in the direction toward the image sensor module.

A size of the first opening on one side of the first window facing the lens module may be smaller than a size of the first opening on another side of the first window facing the image sensor module. A size of the second opening on one side of the second window facing the lens module may be smaller than a size of the second opening on another side of the second window facing the image sensor module.

The size of the first opening on the other side of the first window may be larger than the size of second opening on the one side of the second window.

The first inner wall may be configured to increase a size of the first window in a direction toward the image sensor module. The second inner wall may be configured to decrease a size of the second window in the direction toward the image sensor module.

A size of the first opening on one side of the first window facing the lens module may be smaller than a size of the first opening on another side of the first window facing the image sensor module. A size of the second opening on one side of the second window facing the lens module may be larger than a size of the second opening on another side of the second window facing the image sensor module.

A surface of the first light blocking plate and a surface of the second light blocking plate may each be rougher than a surface of the housing.

A surface of the first light blocking plate and a surface of the second light blocking plate may each have a lower reflectivity than a surface of the housing.

A first protrusion and a second protrusion spaced apart from each other in an optical axis direction may be positioned inside the housing. The first light blocking plate may be disposed between the first protrusion and the second protrusion. The second light blocking plate may be disposed between the second protrusion and the image sensor module.

The first light blocking plate and the second light blocking plate may each include: a rectangular plate having a long side and a short side; and a support portion extending from the short side in an optical axis direction.

The support portion may have a groove.

The light blocking portion may further include a third blocking plate including a third window having a third opening through which the light is allowed to pass. The third window may include a third inner wall including a third inclined surface.

One of the first inclined surface, the second inclined surface, and the third inclined surface may have an inclination direction different from others of the first inclined surface, the second inclined surface, and the third inclined surface.

At least one lens among the plurality of lenses may have a length in a first direction perpendicular to an optical axis that is shorter than a length of the at least one lens in a second direction perpendicular to the optical axis and the first direction. The at least one lens may be disposed such that one side surface of the at least one lens, among side surfaces of the at least one lens facing each other in the first direction, faces a bottom surface of the housing.

In another general aspect, an electronic device includes a camera module mounted in the electronic device. The camera module includes: a lens module including a plurality of lenses; a housing accommodating the lens module; a reflection module disposed in front of the lens module; an image sensor module configured to receive light passing through the lens module; and a light blocking portion disposed in the housing and positioned in a space between the lens module and the image sensor module. The light blocking portion includes: a first light blocking plate including a first window having a first opening through which the light is allowed to pass; and a second light blocking plate including a second window having a second opening through which the light is allowed to pass. The first window includes a first inner wall including a first inclined surface, and the second window includes a second inner wall including a second inclined surface.

An optical axis direction of the plurality of lenses may be perpendicular to a thickness direction of the electronic device and may correspond to either one of a length direction and a width direction of the electronic device. The light may be incident on the reflection module in the thickness direction.

The reflection module may be disposed in front of the lens module in the optical axis direction. The image sensor module may be disposed behind the lens module in the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
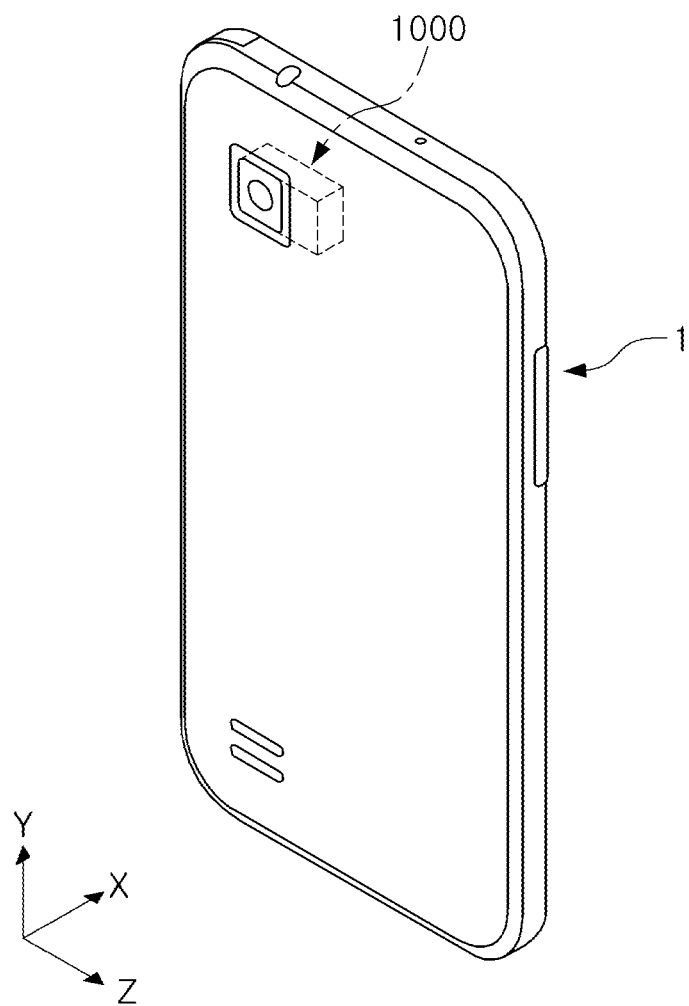
FIG. 1 is a perspective view of a portable electronic device on which a camera module is mounted, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed, as will be apparent after gaining an understanding of this disclosure, with the exception of operations necessarily occurring in a certain order. Also, descriptions of features known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

FIG. 1 is a perspective view of a portable electronic device 1 on which a camera module 1000 is mounted, according to an embodiment.

Referring to FIG. 1, the camera module 1000 may be mounted on the portable electronic device 1 to image a subject, for example. The portable electronic device 1 may be a portable electronic device such as a mobile communications terminal, a smartphone or a tablet PC, but is not limited to these examples.

In an example, the camera module 1000 may include a plurality of lenses. Each lens of the plurality of lenses may have an optical axis (e.g., Z-axis) in a direction perpendicular to the thickness direction of the portable electronic device 1 (e.g., X-axis direction, i.e., direction from the front surface of the portable electronic device 1 to a rear surface of the portable electronic device 1, or vice versa). For example, the plurality of lenses may be positioned in the camera module 1000 to have the optical axis (Z-axis) formed in the width direction or length direction of the portable electronic device 1.

Therefore, the camera module 1000 may prevent the portable electronic device 1 from having an increased thickness, even though the camera module 1000 has functions such as auto focusing (hereinafter referred to as AF), optical zoom (hereinafter, zoom) and optical image stabilization (hereinafter, OIS). Accordingly, the portable electronic device 1 may be made thinner.

The camera module 1000 may have any one or any combination of any two or more of AF, zoom, and OIS functions.

A camera module having AF, zoom and/or OIS functions needs to have various components, and may thus have an increased size compared to a general camera module. When a camera module has increased size, it may be difficult to reduce a thickness of a portable electronic device on which the camera module is mounted.

For example, a camera module may include a plurality of lens groups for its zoom function. When the plurality of lens groups are arranged in the thickness direction of the portable electronic device, the portable electronic device may have an increased thickness based on the number of the lens groups. Accordingly, the portable electronic device may not secure a sufficient number of the lens groups without having an increased thickness, and may thus perform a weak zoom function.

In addition, in order to perform the AF, zoom and OIS functions, there is a need to install an actuator moving the plurality of lens groups in the optical axis direction or in a direction perpendicular to the optical axis. When the lens group has the optical axis (Z-axis) formed in the thickness direction of the portable electronic device, the actuator moving the lens group may also need to be installed in the thickness direction of the portable electronic device. Therefore, the portable electronic device may have a further increased thickness.

However, the camera module 1000 may be disposed in such a manner that the plurality of lenses each have the optical axis (Z-axis) perpendicular to the thickness direction (X-axis direction) of the portable electronic device 1. Therefore, the portable electronic device 1 may be made thinner even though the camera module 1000 has the AF, zoom and OIS functions.

Figure 2:
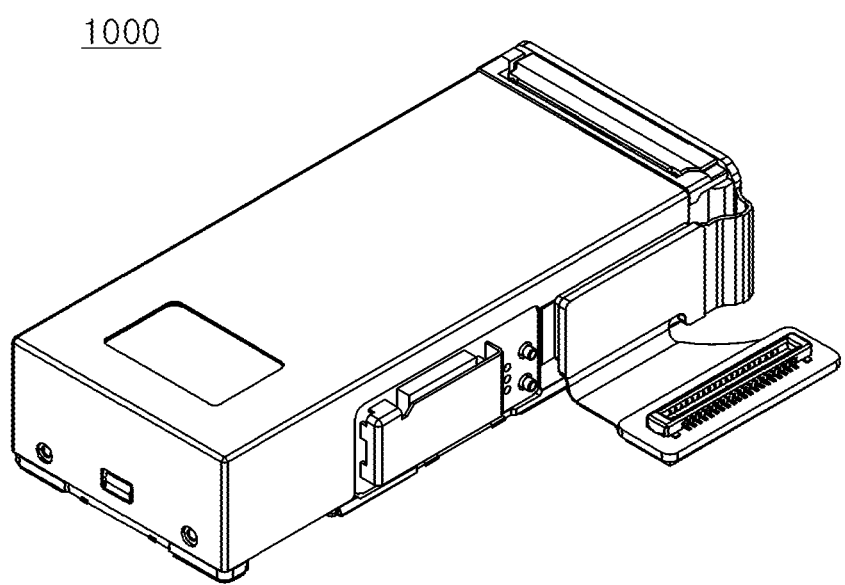
FIG. 2 is a schematic perspective view of the camera module, according to an embodiment.
Figure 3:
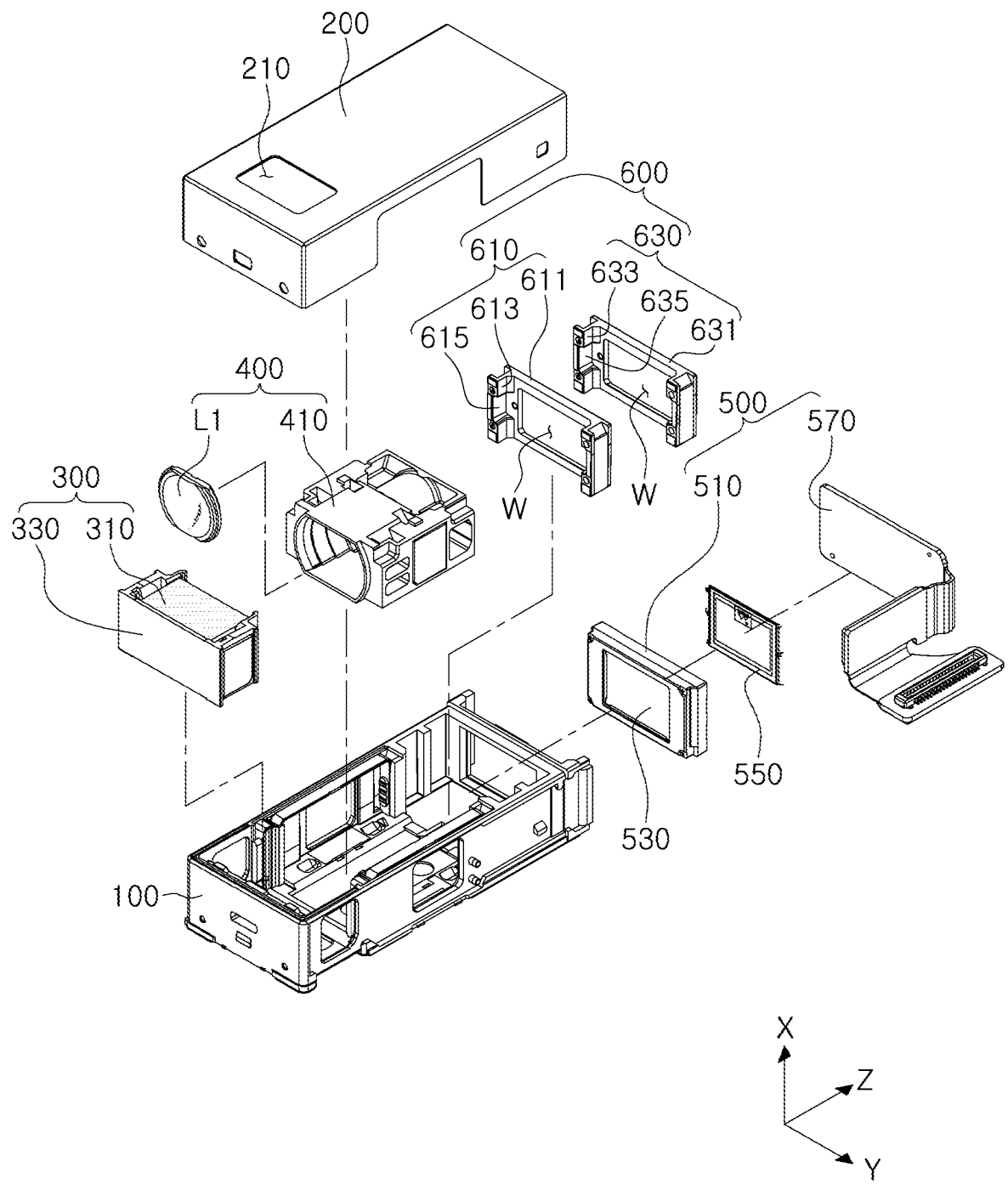
FIG. 3 is a schematic exploded perspective view of the camera module, according to an embodiment.
Figure 4:
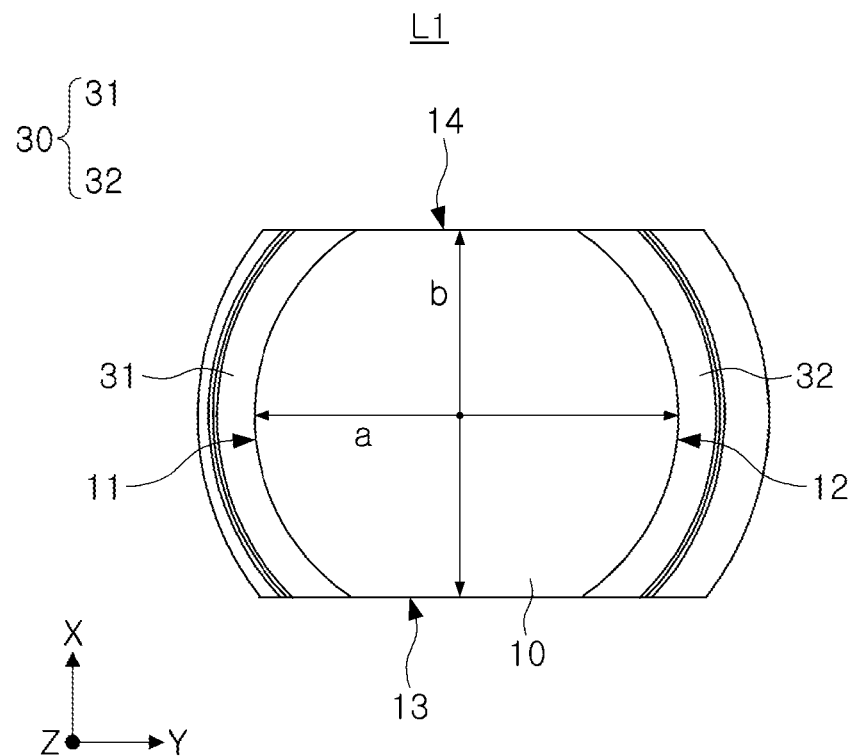
FIG. 4 is a plan view of a lens included in the camera module, according to an embodiment.

FIG. 2 is a schematic perspective view of the camera module 1000, according to an embodiment. FIG. 3 is a schematic exploded perspective view of the camera module 1000, according to an embodiment. FIG. 4 is a plan view of a lens L1 included in the camera module 1000, according to an embodiment.

Referring to FIGS. 2 and 3, the camera module 1000 may include, for example, a housing 100, a reflection module 300, a lens module 400, an image sensor module 500 and a case 200.

The reflection module 300, the lens module 400 and the image sensor module 500 may be arranged inside the housing 100 from one side of the housing 100 to another side of the housing 100. The housing 100 may have an internal space configured to accommodate the reflection module 300, the lens module 400 and the image sensor module 500. However, in another example, the image sensor module 500 may be attached to the outside of the housing 100.

FIGS. 2 and 3 each show an embodiment in which the reflection module 300, the lens module 400 and the image sensor module 500 are arranged inside the housing 100. However, unlike the embodiments of FIGS. 2 and 3, the reflection module 300 may be disposed outside the housing 100, and, in such a case, one side of the housing 100 may be open to allow light transmitted from the reflection module 300 to pass therethrough.

The housing 100 may be formed in a shape of a box having an open top.

The case 200 may be coupled to the housing 100 to cover the top of the housing 100. The case 200 may have an opening 210 to allow light to be incident therethrough. The light incident through the opening 210 of the case 200 may have a travel direction changed by the reflection module 300 and may be incident on the lens module 400.

The reflection module 300 may change the direction of light travel. For example, the reflection module 300 may change the travel direction of the light incident into the housing 100 to face the lens module 400. The reflection module 300 may be disposed in front of the lens module 400.

The reflection module 300 may include a reflective member 310 and a holder 330 on which the reflective member 310 is mounted.

The reflective member 310 may change the direction of light travel. For example, the reflective member 310 may be a mirror or a prism that reflects light.

The lens module 400 may include a plurality of lenses through which light of which a travel direction has been changed by the reflective member 310 passes, and a lens barrel 410 accommodating the plurality of lenses.

For convenience of description, FIG. 3 only shows a lens L1 (hereinafter, referred to as the "first lens L1" disposed closest to the subject among the plurality of lenses.

The image sensor module 500 may include a sensor housing 510, an infrared blocking filter 530, an image sensor 550 and a printed circuit board 570.

The infrared blocking filter 530 may be mounted on the sensor housing 510. The infrared blocking filter 530 may block light in an infrared region from light passing through the lens module 400.

The printed circuit board 570 may be coupled to the sensor housing 510, and the image sensor 550 may be positioned on the printed circuit board 570.

The light passing through the lens module 400 may be received by the image sensor module 500 (e.g., image sensor 550).

At least one of the plurality of lenses may have a shape of a non-circular plane. For example, the first lens L1 may be non-circular when viewed from the optical axis direction (Z-axis direction). Meanwhile, the plurality of lenses may also each have the shape of the non-circular plane.

Referring to FIG. 4, in a plane perpendicular to the optical axis (Z-axis), the first lens L1 may have a length in a first direction (X-axis direction) perpendicular to the optical axis (Z-axis) shorter than a length in a second direction (Y-axis direction) perpendicular to both the optical axis (Z-axis) and the first direction (X-axis direction).

For example, the first lens L1 may have a major axis and a minor axis. The minor axis may be a line segment connecting the opposite sides of the first lens L1 to each other in the first direction (X-axis direction) while passing through the optical axis (Z-axis), and the major axis may be a line segment connecting the opposite sides of the first lens L1 to each other in the second direction (Y-axis direction) while passing through the optical axis (Z-axis). The major axis and the minor axis may be perpendicular to each other, and the major axis may have a length longer than the minor axis.

The first lens L1 may include an optical portion 10 and a flange portion 30.

The optical portion 10 may be a portion configured to perform the optical performance of the first lens L1. For example, light reflected from the subject may be refracted while passing through the optical portion 10.

The optical portion 10 may have refractive power and have an aspherical shape.

The flange portion 30 may be a component that fixes the first lens L1 to another component, for example, the lens barrel 410 or another lens.

The flange portion 30 may extend from the optical portion 10 and may be integrally formed with the optical portion 10.

The optical portion 10 may be formed in a non-circular shape. For example, the optical portion 10 may be non-circular when viewed from the optical axis direction (Z-axis direction). Referring to FIG. 4, in the plane perpendicular to the optical axis (Z-axis), the optical portion 10 may have a length in the first direction (X-axis direction) perpendicular to the optical axis (Z-axis) shorter than a length in the second direction (Y-axis direction) perpendicular to both the optical axis (Z-axis) and the first direction (X-axis direction).

The optical portion 10 may include a first edge 11, a second edge 12, a third edge 13 and a fourth edge 14.

When viewed from the optical axis direction (Z-axis direction), the first edge 11 and the second edge 12 may each have an arc shape.

The second edge 12 may be positioned opposite to the first edge 11. In addition, the first edge 11 and the second edge 12 may be positioned to oppose each other based on the optical axis (Z-axis). In other words, the first edge 11 and the second edge 12 may be spaced apart from each other at opposing positions in a Y-axis direction.

The fourth edge 14 may be positioned opposite to the third edge 13. In addition, the third edge 13 and the fourth edge 14 may be positioned to oppose each other based on the optical axis (Z-axis). In other words, the third edge 13 and the fourth edge 14 may be spaced apart from each other at opposing positions in an X-axis direction.

The third edge 13 and the fourth edge 14 may connect the first edge 11 and the second edge 12 to each other, respectively. The third edge 13 and the fourth edge 14 may be symmetrical with respect to the optical axis (Z-axis), and may be formed parallel to each other.

When viewed from the optical axis direction (Z-axis direction), the first edge 11 and the second edge 12 may each have an arc shape, and the third edge 13 and the fourth edge 14 may each have a substantially straight-line shape.

The optical portion 10 may have a major axis (a) and a minor axis (b). The minor axis (b) may be a line segment connecting the third edge 13 and the fourth edge 14 to each other with the shortest distance while passing through the optical axis (Z-axis), and the major axis (a) may be a line segment connecting the first edge 11 and the second edge 12 to each other while passing through the optical axis (Z-axis), and perpendicular to the minor axis (b). The major axis (a) may have a length longer than the minor axis (b).

The flange portion 30 may extend along a partial circumference of the optical portion 10 in the second direction (Y-axis direction). At least a portion of the flange portion 30 may be in contact with the inner surface of the lens barrel 410.

The flange portion 30 may include a first flange portion 31 and a second flange portion 32. The first flange portion 31 may extend from the first edge 11 of the optical portion 10, and the second flange portion 32 may extend from the second edge 12 of the optical portion 10.

The first edge 11 of the optical portion 10 may be a portion adjacent to the first flange portion 31, and the second edge 12 of the optical portion 10 may be a portion adjacent to the second flange portion 32.

The third edge 13 of the optical portion 10 may be one side surface of the optical portion 10, in which the flange portion 30 is not formed and the fourth edge 14 of the optical portion 10 may be the other side surface of the optical portion 10 in which the flange portion 30 is not formed.

Referring to FIG. 3, the first lens L1 may be disposed to allow one of its side surfaces facing each other in the first direction (X-axis direction) to face a bottom surface of the housing 100, and its side surfaces facing each other in the second direction (Y-axis direction) to oppose the inner side surfaces of the housing 10, respectively. That is, the side surfaces of the first lens L1 facing each other in the first direction (X-axis direction) are spaced apart in the thickness direction (X-axis direction) of the housing 100, and the side surfaces of the first lens L1 facing each other in the second direction (Y-axis direction) are spaced apart in the width direction (Y-axis direction) of the housing 100.

The first lens L1 may have the length in the first direction (X-axis direction) shorter than the length in the second direction (Y-axis direction), and it is thus possible to reduce the thickness of the housing 100.

The thickness direction of the housing 100 (X-axis direction) and the thickness direction of the portable electronic device 1 (X-axis direction) approximately coincide with each other, and it is thus also possible to reduce the thickness of the portable electronic device 1.

Figure 5:
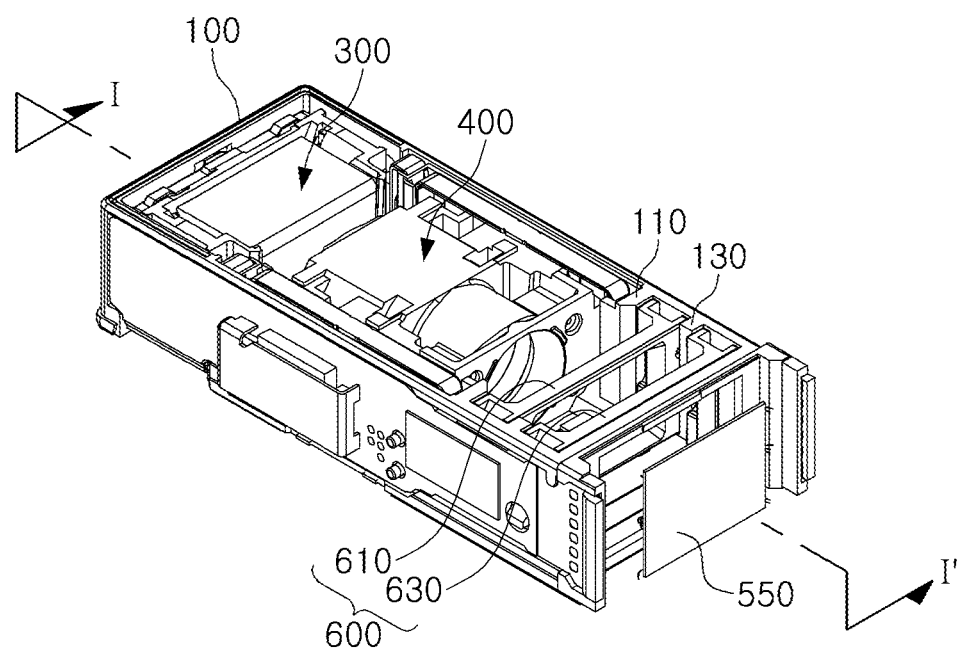
FIG. 5 is a schematic perspective view of a state in which a case is removed from the camera module.
Figure 6:
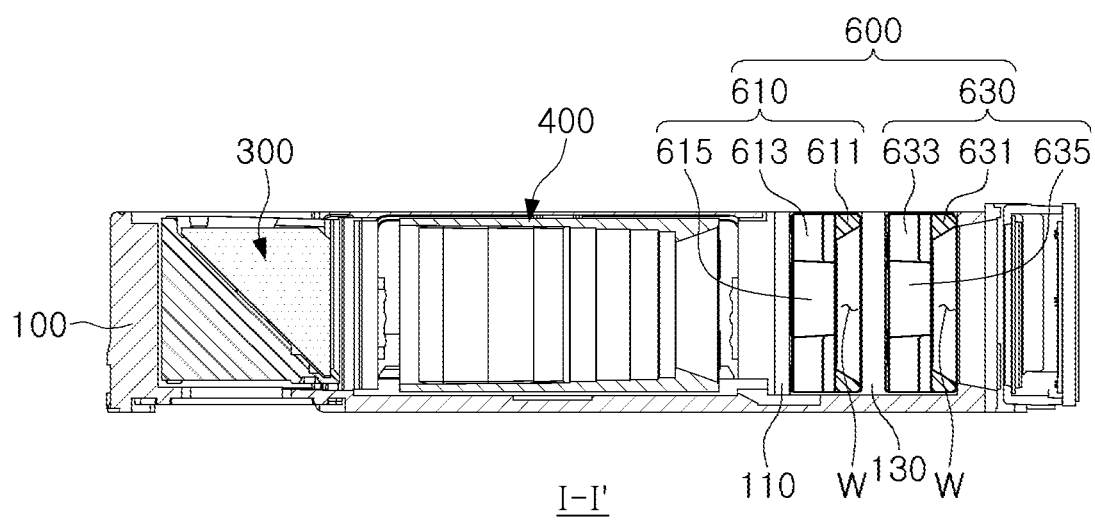
FIG. 6 is a cross sectional view taken along line I-I' of FIG. 5.

FIG. 5 is a schematic perspective view of a state in which the case 200 is removed from the camera module 1000. FIG. 6 is a cross sectional view taken along line I-I' of FIG. 5.

The camera module 1000 may include the reflection module 300, the lens module 400 and the image sensor module 500 arranged in the optical axis direction (Z-axis direction). Therefore, the light of which the travel direction has been changed by the reflection module 300 may pass through the lens module 400 and may then be incident on the image sensor 550.

If unintended reflection occurs before the light is incident on the image sensor 550, there is a risk of a flare phenomenon.

For example, the flare phenomenon may occur if the light passing through the lens module 400 hits the bottom surface of the housing 100 or the inner surface of the case 200 (e.g., the surface of the case 200 opposing the bottom surface of the housing 100) before reaching the image sensor 550, and is then reflected.

That is, the flare phenomenon may occur due to internal reflection occurring in a space between the lens module 400 and the image sensor 550.

The camera module 1000 may include a light blocking portion 600 to prevent the flare phenomenon from occurring due to the unintended light reflection. The light blocking portion 600 may be disposed in a space between the lens module 400 and the image sensor module 500. For example, the light blocking portion 600 may be disposed in a space between the image sensor module 500 and a lens closest to the image sensor module 500 among the plurality of lenses positioned in the lens module 400.

Therefore, even if the unintended light reflection occurs, light diffusely reflected by the light blocking portion 600 may be prevented from being incident on the image sensor 550, and it is thus possible to suppress the flare phenomenon.

The light blocking portion 600 may include a plurality of light blocking plates. For example, the light blocking portion 600 may include at least two blocking plates.

For example, the light blocking portion 600 may include a first light blocking plate 610 and a second light blocking plate 630. The first light blocking plate 610 and the second light blocking plate 630 may be spaced apart from each other in the optical axis direction (Z-axis direction).

The first light blocking plate 610 and the second light blocking plate 630 may each have an opening type window W through which the light passes to allow the light passing through the lens module 400 to be incident on the image sensor 550. Light used for forming an image may pass through the window W and may be incident on the image sensor 550, and light that may cause the flare phenomenon may be blocked by the first light blocking plate 610 and the second light blocking plate 630.

It is difficult to accurately predict the light diffusely reflected inside the housing 100. Therefore, it may not be sufficient to block unnecessary light when the light blocking portion 600 includes only one blocking plate. Thus, the light blocking portion 600 may include the plurality of blocking plates 610 and 630, and may thus more effectively suppress the flare phenomenon than a light blocking portion including only one blocking plate.

Referring to FIG. 6, an inner wall of the window W of the first light blocking plate 610 and an inner wall of the window W of the second light blocking plate 630 may each include an inclined surface. For example, the inner wall of the window W of the first light blocking plate 610 and the inner wall of the window W of the second light blocking plate 630 may respectively include inclined surfaces having the same inclination direction.

The inner wall of the window W of the first light blocking plate 610 and the inner wall of the window W of the second light blocking plate 630 may each include the inclined surface to have an increased size of the window W along the direction of light travel. For example, the window W of the first light blocking plate 610 and the window W of the second light blocking plate 630 may have a size of the window W that increases in a direction toward the image sensor module 500.

The size of the opening on one side of the window W of the first light blocking plate 610 is smaller than the size of the opening on the other side of the window W of the first light blocking plate 610. In addition, the size of the opening on one side of the window W of the second light blocking plate 630 is smaller than the size of the opening on the other side of the window W of the second light blocking plate 630. Here, "one side" may be a side facing the lens module 400, and "the other side" may be a side facing the image sensor module 500. Additionally, in the description herein, a "size" of an opening of the window W is, for example, an area of the opening.

The other side of the window W of the first light blocking plate 610 may have a size larger than one side of the window W of the second light blocking plate 630.

The flare phenomenon may occur even when light is reflected from a surface of the first light blocking plate 610 and/or a surface of the second light blocking plate 630 and then incident on the image sensor 550. Therefore, the surface of the first light blocking plate 610 and the surface of the second light blocking plate 630 may each be surface-treated to scatter the light.

For example, the surface of the first light blocking plate 610 and the surface of the second light blocking plate 630 may be formed to be rough. For example, the surface of the first light blocking plate 610 and the surface of the second light blocking plate 630 may each be rougher than a surface of the housing 100. For example, the surface of the first light blocking plate 610 and the surface of the second light blocking plate 630 may each be corroded to be rough.

The light absorbing layer may be positioned on the surface of the first light blocking plate 610 and the surface of the second light blocking plate 630 to block the unnecessary light. For example, the surface of the first light blocking plate 610 and the surface of the second light blocking plate 630 may each have a lower reflectivity than the surface of the housing 100. The light absorbing layer may be black.

The housing 100 may have a first protrusion 110 and a second protrusion 130.

The first protrusion 110 may perform a stopper function that limits a moving distance of the lens module 400 in the optical axis direction (Z-axis direction).

The second protrusion 130 may be disposed to be spaced apart from the first protrusion 110 in the optical axis direction (Z-axis direction). For example, the second protrusion 130 may be disposed between the first protrusion 110 and the image sensor module 500.

The first light blocking plate 610 may be disposed in a space between the first protrusion 110 and the second protrusion 130, and the second light blocking plate 630 may be disposed in a space between the second protrusion 130 and the image sensor module 500. Therefore, the first light blocking plate 610 and the second light blocking plate 630 may be firmly maintained inside the housing 100.

The first light blocking plate 610 and the second light blocking plate 630 may include respective rectangular plates 611 and 631 each having a long side and a short side, and respective support portions 613 and 633 extending from the plates 611 and 631, respectively.

The plates 611 and 631 may each have the window W. The support portions 613 and 633 may extend from the short sides of the plates 611 and 631 in the optical axis direction (Z-axis direction), respectively.

The support portion 613 of the first light blocking plate 610 may be fitted between the first protrusion 110 and the second protrusion 130. For example, the support portion 613 of the first light blocking plate 610 may be in contact with the first protrusion 110 and the rectangular plate 611 may be in contact with the second protrusion 130.

The support portion 633 of the second light blocking plate 630 may be fitted between the second protrusion 130 and the image sensor module 500. For example, the support portion 633 of the second light blocking plate 630 may be in contact with the second protrusion 130.

The support portions 613 and 633 may have respective grooves 615 and 635. The grooves 615 and 635 may each be formed in the support portions 613 and 633, and even if some of the light passing through the lens module 400 hits the support portions 613 and 633 and is then reflected, the reflected light may be blocked by the grooves 615 and 635 and thus be prevented from being incident on the image sensor 550. Therefore, it is possible to effectively prevent the flare phenomenon.

Referring to FIG. 6, the support portion 613 of the first light blocking plate 610 and the support portion 633 of the second light blocking plate 630 may each extend toward the lens module 400 in the optical axis direction (Z-axis direction). That is, as shown in FIG. 6, the support portion 613 of the first light blocking plate 610 and the support portion 633 of the second light blocking plate 630 may extend in the same direction.

FIGS. 7 through 10 are views each showing a modified example of the configuration of FIG. 6.

Figure 7:
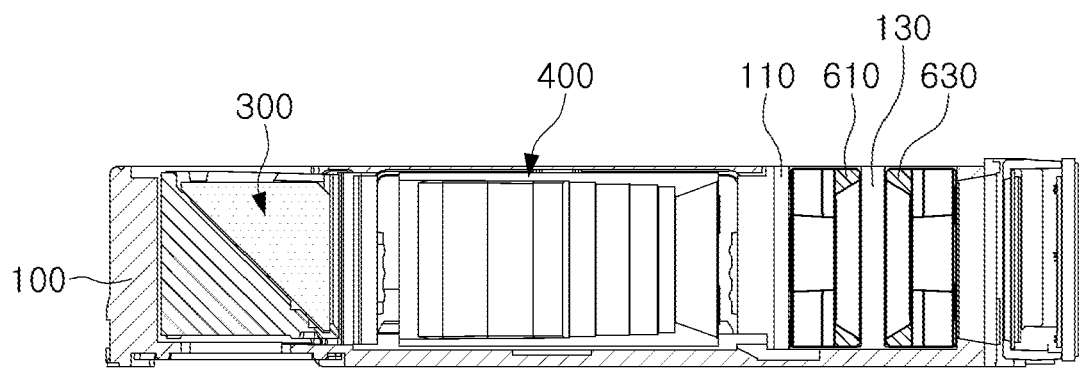
FIGS. 7 through 10 are views each showing a modified example of the configuration of FIG. 6.

Referring to FIG. 7, the first light blocking plate 610 and the second light blocking plate 630 may be disposed to be spaced apart from each other in the optical axis direction (Z-axis direction). The first light blocking plate 610 may be disposed in the space between the first protrusion 110 and the second protrusion 130, and the second light blocking plate 630 may be disposed in the space between the second protrusion 130 and the image sensor module 500.

The inner wall of the window W of the first light blocking plate 610 and the inner wall of the window W of the second light blocking plate 630 may each include the inclined surface.

The inner wall of the window W of the first light blocking plate 610 may include the inclined surface to allow the size of the window W to be increased along the direction of light travel. For example, the window W of the first light blocking plate 610 may have a size of the window W that increases in a direction toward the image sensor module 500. The size of the opening on the one side of the window W of the first light blocking plate 610 is smaller than the size of the opening on the other side of the window W of the first light blocking plate 610.

The inner wall of the window W of the second light blocking plate 630 may include the inclined surface to have a decreased size of the window W along the direction of light travel. For example, the window W of the second light blocking plate 630 may have a size of the window W that decreases in a direction toward the image sensor module 500. The size of the opening on one side of the window W of the second light blocking plate 630 is larger than the size of the opening on the other side of the window W of the second light blocking plate 630. Here, "the one side" may be a side facing the lens module 400, and "the other side" may be a side facing the image sensor module 500.

That is, the inner wall of the window W of the first light blocking plate 610 and the inner wall of the window W of the second light blocking plate 630 may include inclined surfaces having inclination directions opposite to each other, respectively.

Referring to FIG. 7, the support portion 613 of the first light blocking plate 610 may extend toward the lens module 400 in the optical axis direction (Z-axis direction), and the support portion 633 of the second light blocking plate 630 may extend toward the image sensor module 500 in the optical axis direction (Z-axis direction). That is, as shown in an exemplary embodiment of FIG. 7, the support portion 613 of the first light blocking plate 610 and the support portion 633 of the second light blocking plate 630 may extend in directions opposite to each other.

Figure 8:
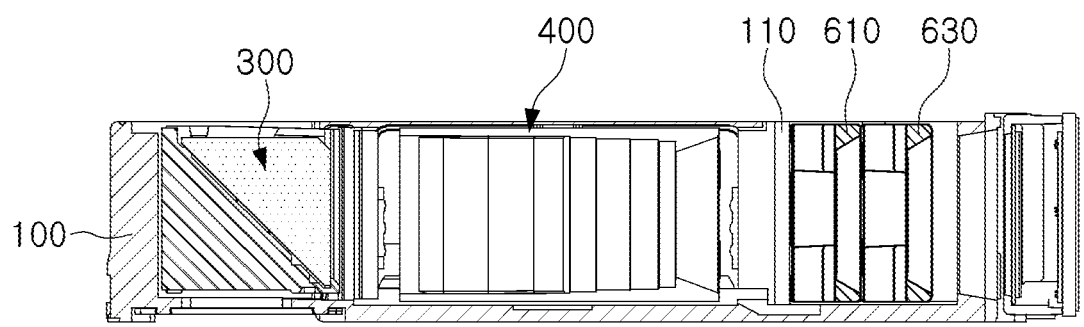

The embodiment shown in FIG. 8 may be the same as the embodiment shown in FIG. 6 except that the first light blocking plate 610 and the second light blocking plate 630 are disposed to be in contact with each other.

Figure 9:
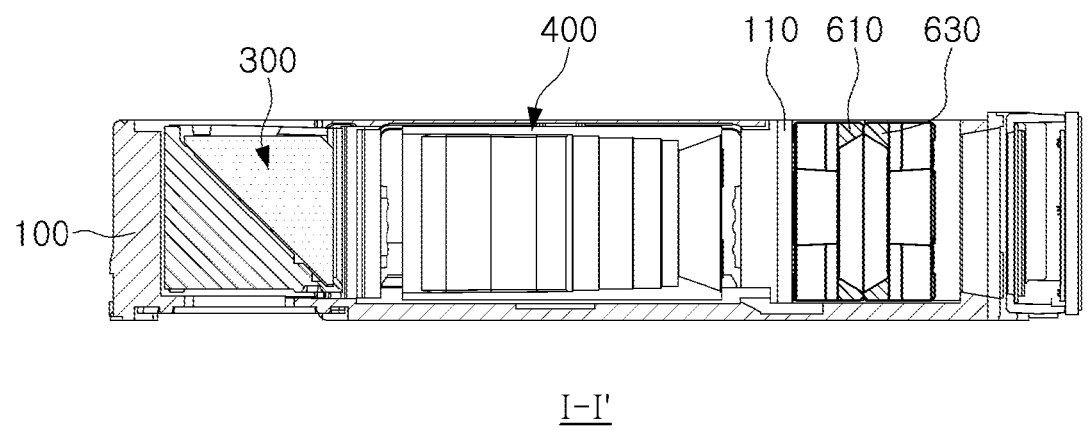

The embodiment shown in FIG. 9 may be the same as the embodiment shown in FIG. 7 except that the first light blocking plate 610 and the second light blocking plate 630 are disposed to be in contact with each other.

Figure 10:
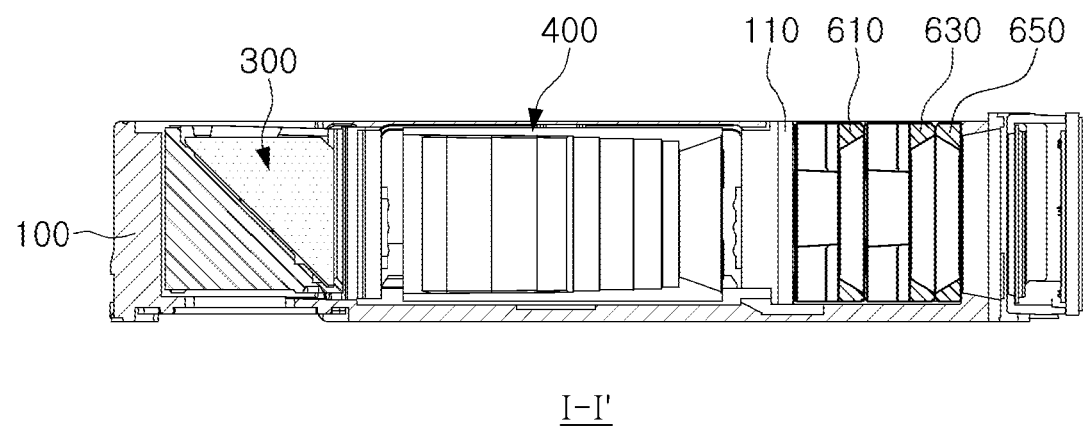

Referring to FIG. 10, the light blocking portion 600 may further include a third blocking plate 650. For example, the light blocking portion 600 may include the first light blocking plate 610, the second light blocking plate 630, and the third blocking plate 650, which are arranged in the optical axis direction (Z-axis direction).

The first light blocking plate 610, the second light blocking plate 630, and the third blocking plate 650 may be arranged to be in contact with each other. For example, the first light blocking plate 610 and the second light blocking plate 630 may be in contact with each other, and the second light blocking plate 630 and the third blocking plate 650 may be in contact with each other.

The first light blocking plate 610, the second light blocking plate 630, and the third blocking plate 650 may each have the opening type window W through which the light passes, and the inner wall of each window W may include an inclined surface.

The inclined surface of one of the inner wall of the window W of the first light blocking plate 610, the inner wall of the window W of the second light blocking plate 630, and the inner wall of the window W of the third blocking plate 650 may have an inclination direction different from an inclination direction of the inclined surface of the others of the inner wall of the window W of the first light blocking plate 610, the inner wall of the window W of the second light blocking plate 630, and the inner wall of the window W of the third blocking plate 650.

For example, the inner wall of the window W of the first light blocking plate 610 may include the inclined surface to have the increased size of the window W along the direction of light travel. For example, the size of the opening on the one side of the window W of the first light blocking plate 610 is smaller than the size of the opening on the other side of the window W of the first light blocking plate 610.

The inner wall of the window W of the second light blocking plate 630 may include the inclined surface to have the increased size of the window W along the direction of light travel. For example, the size of the opening on the one side of the window W of the second light blocking plate 630 is smaller than the size of the opening on the other side of the window W of the second light blocking plate 630.

The size of the opening on the other side of the window W of the first light blocking plate 610 is larger than the size of the opening on the one side of the window W of the second light blocking plate 630.

The inner wall of the window W of the third blocking plate 650 may include the inclined surface to have a decreased size of the window W along the direction of light travel. For example, the size of the opening on the one side of the window W of the third light blocking plate 650 is larger than the size of the opening on the other side of the window W of the third light blocking plate 650.

Here, "the one side" may be a side facing the lens module 400, and "the other side" may be a side facing the image sensor module 500.

As described above, it is possible to more effectively suppress a flare phenomenon by configuring a light blocking portion (e.g., the light blocking portion 600) in various ways.

As set forth above, a camera module according to embodiments disclosed herein may prevent a flare phenomenon.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a lens module including a plurality of lenses;
   a housing accommodating the lens module;
   a reflection module disposed in front of the lens module;
   an image sensor configured to receive light passing through the lens module; and
   a light blocking portion disposed in the housing and positioned in a space between the lens module and the image sensor, and including:
   a first light blocking plate including a first window having a first opening through which the light is allowed to pass; and
   a second light blocking plate including a second window having a second opening through which the light is allowed to pass,
   wherein the first window includes a first inner wall including a first inclined surface, and the second window includes a second inner wall including a second inclined surface, and
   wherein the first light blocking plate or the second light blocking plate include:
   a rectangular plate having a long side and a short side; and
   a support portion extending from the short side in an optical axis direction.

2. The camera module of claim 1,
   wherein the first inner wall is configured to increase a size of the first window in a direction toward the image sensor, and
   wherein the second inner wall is configured to increase a size of the second window in the direction toward the image sensor.

3. The camera module of claim 1, wherein a size of the first opening on one side of the first window facing the lens module is smaller than a size of the first opening on another side of the first window facing the image sensor, and
   wherein a size of the second opening on one side of the second window facing the lens module is smaller than a size of the second opening on another side of the second window facing the image sensor.

4. The camera module of claim 3, wherein the size of the first opening on the other side of the first window is larger than the size of second opening on the one side of the second window.

5. The camera module of claim 1, wherein a surface of the first light blocking plate and a surface of the second light blocking plate are each rougher than a surface of the housing.

6. The camera module of claim 1, wherein a surface of the first light blocking plate and a surface of the second light blocking plate each have a lower reflectivity than a surface of the housing.

7. The camera module of claim 1, wherein a first protrusion and a second protrusion spaced apart from each other in the optical axis direction are positioned inside the housing,
   wherein the first light blocking plate is disposed between the first protrusion and the second protrusion, and
   wherein the second light blocking plate is disposed between the second protrusion and the image sensor.

8. The camera module of claim 1, wherein the first light blocking plate and the second light blocking plate each include:
   a corresponding rectangular plate having a corresponding long side and a corresponding short side; and
   a corresponding support portion extending from the short side in the optical axis direction.

9. The camera module of claim 8, wherein the support portion has a groove.

10. The camera module of claim 1, wherein at least one lens among the plurality of lenses has a maximum length in a first direction perpendicular to an optical axis, of the at least one lens, that is shorter than a maximum length of the at least one lens in a second direction perpendicular to the optical axis and the first direction, and
    the at least one lens is disposed such that one side surface of the at least one lens, among side surfaces of the at least one lens facing each other in the first direction, faces a bottom surface of the housing.

11. The camera module of claim 1,
    wherein the first inner wall is configured to increase a size of the first window in a direction toward the image sensor,
    wherein the second inner wall is configured to decrease a size of the second window in the direction toward the image sensor, and
    wherein the second light blocking plate is closer to the image sensor than the first light blocking plate.

12. The camera module of claim 1,
    wherein the light blocking portion further includes a third blocking plate including a third window having a third opening through which the light is allowed to pass, and
    wherein the third window includes a third inner wall including a third inclined surface.

13. The camera module of claim 12, wherein one of the first inclined surface, the second inclined surface, and the third inclined surface has an inclination direction different from others of the first inclined surface, the second inclined surface, and the third inclined surface.

14. A camera module, comprising:
    a lens module including a plurality of lenses;
    a housing accommodating the lens module;
    a reflection module disposed in front of the lens module;
    an image sensor configured to receive light passing through the lens module; and
    a light blocking portion disposed in the housing and positioned in a space between the lens module and the image sensor, and including:

a first light blocking plate including a first window having a first opening through which the light is allowed to pass; and a second light blocking plate including a second window having a second opening through which the light is allowed to pass, wherein the first window includes a first inner wall including a first inclined surface, the second window includes a second inner wall including a second inclined surface, wherein the second inner wall is configured to decrease a size of the second window in a direction toward the image sensor, and wherein the second light blocking plate is closer to the image sensor than the first light blocking plate.

15. The camera module of claim 14, wherein the first inner wall is configured to increase a size of the first window in the direction toward the image sensor.

16. The camera module of claim 15, wherein the light blocking portion further includes a third blocking plate including a third window having a third opening through which the light is allowed to pass, wherein the third window includes a third inner wall including a third inclined surface, and wherein the third light blocking plate is closer to the image sensor than the second light blocking plate.

17. The camera module of claim 15, wherein the light blocking portion further includes a third blocking plate including a third window having a third opening through which the light is allowed to pass, wherein the third window includes a third inner wall including a third inclined surface, and wherein the second light blocking plate is closer to the image sensor than the third light blocking plate, which is closer to the image sensor than the first light blocking plate.

18. The camera module of claim 14, wherein the light blocking portion further includes a third blocking plate including a third window having a third opening through which the light is allowed to pass, wherein the third window includes a third inner wall including a third inclined surface, and wherein the second light blocking plate and the third light blocking plate are both closer to the image sensor than the first light blocking plate.

19. The camera module of claim 18, wherein one of the first inclined surface, the second inclined surface, and the third inclined surface has an inclination direction different from others of the first inclined surface, the second inclined surface, and the third inclined surface.

20. An electronic device, comprising:
a camera module mounted in the electronic device, and comprising:
a lens module including a plurality of lenses;
a housing accommodating the lens module;
a reflection module disposed in front of the lens module;
an image sensor configured to receive light passing through the lens module; and
a light blocking portion disposed in the housing and positioned in a space between the lens module and the image sensor, and including:
a first light blocking plate including a first window having a first opening through which the light is allowed to pass; and
a second light blocking plate including a second window having a second opening through which the light is allowed to pass,
wherein the first window includes a first inner wall including a first inclined surface, and the second window includes a second inner wall including a second inclined surface, and
wherein the first light blocking plate or the second light blocking plate include:
a rectangular plate having a long side and a short side; and
a support portion extending from the short side in an optical axis direction.

21. The electronic device of claim 20, wherein an optical axis of the plurality of lenses is perpendicular to a thickness direction of the electronic device and corresponds to either one of a length direction and a width direction of the electronic device, and
wherein the light is incident on the reflection module in the thickness direction.

22. The electronic device of claim 21, wherein the reflection module is disposed in front of the lens module in the optical axis direction, and the image sensor is disposed behind the lens module in the optical axis direction.

* * * * *